United States Patent
Shah (10) Patent No.: US 10,643,208 B2
(45) Date of Patent: May 5, 2020

(54) DIGITAL PAYMENT SYSTEM

(71) Applicant: Netspective Communications LLC, Silver Spring, MD (US)

(72) Inventor: Shahid N. Shah, Silver Spring, MD (US)

(73) Assignee: Netspective Communications LLC, Silver Spring, MD (US)

( * ) Notice: Subject to any disclaimer, the term of this patent is extended or adjusted under 35 U.S.C. 154(b) by 0 days.

(21) Appl. No.: 16/283,802

(22) Filed: Feb. 24, 2019

(65) Prior Publication Data

US 2019/0188708 A1    Jun. 20, 2019

(51) Int. Cl.
G06Q 40/00    (2012.01)
G06Q 20/40    (2012.01)
G06Q 20/08    (2012.01)
G06Q 20/02    (2012.01)

(52) U.S. Cl.
CPC .......... *G06Q 20/40* (2013.01); *G06Q 20/02* (2013.01); *G06Q 20/0855* (2013.01); *G06Q 40/00* (2013.01)

(58) Field of Classification Search
CPC ..................................................... G06Q 40/00
See application file for complete search history.

(56) References Cited

U.S. PATENT DOCUMENTS

| | | | | |
|---|---|---|---|---|
| 7,440,923 B1 * | 10/2008 | Compiano | ............. | G06Q 20/40 705/35 |
| 2005/0075977 A1 * | 4/2005 | Carroll | .................. | G06Q 40/00 705/40 |
| 2005/0267782 A1 | 12/2005 | Zahlmann et al. | | |
| 2010/0228672 A1 * | 9/2010 | Karim | .................... | G06Q 20/40 705/44 |
| 2011/0313915 A1 | 12/2011 | Tang | | |
| 2011/0320347 A1 * | 12/2011 | Tumminaro | ....... | G06Q 20/0855 705/39 |
| 2013/0166455 A1 | 6/2013 | Feigelson | | |
| 2014/0317644 A1 | 10/2014 | Bermudez | | |
| 2015/0332395 A1 | 11/2015 | Walker et al. | | |

OTHER PUBLICATIONS

Stacey L. Schreft, How and Why Do Consumers Choose Their Payment Methods?, Apr. 2006, The Federal Reserve Bank of Kansas City, web, pp. 2-18 (Year: 2006).*

* cited by examiner

*Primary Examiner* — I Jung Liu
(74) *Attorney, Agent, or Firm* — Rahman LLC

(57) ABSTRACT

A digital payment system for facilitating seamless transactions from a user system to a buyer system. The system includes a service provider system which further includes a service interaction component. The service interaction component is configured to collect predefined information about the user system and the associated user. The service provider system also includes a payment engine for processing payments digitally based on data worth associated with the data owned by the user and authorized for sharing by the service provider to the buyer system. The payment engine calculates a payable amount payable digitally by the user to the service provider based on a digital transactional value indicative of the data worth associated with the data owned by the user and authorized for sharing, among other things. The system further includes a pre-consenting system configured to facilitate user authorization.

15 Claims, 7 Drawing Sheets

DIGITAL PAYMENT SYSTEM

BACKGROUND

Technical Field

The embodiments herein generally relate to computer-controlled systems, and more particularly to a computer-controlled payment system for enabling transactions digitally over a conventional banking or a blockchain-enabled network.

Description of the Related Art

In a service ecosystem, when two or more parties are involved, a lot of transactions happen between the service buyer and the service provider for the purchase and delivery of services. Among these service ecosystems, payment transactions have received a lot of attention from the service provider and the buyer system since a payment is central to building a service ecosystem. Most of the payment modes are still dependent on traditional financial instruments such as cash and credits. Thus, these service providers are in a fierce race to develop more ways of facilitating payments to become most widely accepted payment services. In an attempt to provide more ubiquitous means for transferring value, the service providers are focusing on using crypto currencies such as bitcoin. However, these currencies have their own benefits and limitations.

Therefore, in the light of the above, there is still a need of a new and a more secured and enhanced dynamic mode of payment, which is powered safely by an individual purchasing the services in the service ecosystem.

SUMMARY

An embodiment herein provides a computer-controlled payment system for facilitating seamless transactions from a user system to a buyer system via an intermediary system. The system includes a service provider system associated with a service provider and located physically in a service setting that includes one or more central servers, data stores, and cloud-based computing components for managing and processing delivery of a service in the service setting by the service provider to the user associated with the user system.

The service provider system includes a service interaction component to generate an electronic signal transmitted to the user system using a transmission circuit. The electronic signal allows communication between the user system and the service provider system. The service interaction component is further configured to collect predefined information about the user system and the associated user. The predefined information includes at least a first computer-executable input indicative of an identifier of the user system and the associated user and a second computer-executable input indicative of a service sought for delivery in the service setting by the service provider.

The service provider system includes a payment engine for processing payments digitally based on data worth associated with the data owned by the user and authorized for sharing by the service provider to the buyer system. The payment engine calculates a payable amount payable digitally by the user to the service provider based on a first digital transactional value indicative of a service charge for the service delivered digitally by the service provider, a second digital transactional value indicative of a predefined co-pay between the user and a co-pay entity, and a third digital transactional value indicative of the data worth associated with the data owned by the user and authorized for sharing. The data worth is calculated based on a set of predefined criteria specified by the buyer entity for a set of data types, data entities and data attributes.

The system further includes a pre-consenting system located remotely from the user system and communicatively coupled to the service provider system in the service setting. The pre-consenting system is configured to receive a digital signal containing a third computer executable authorization input for authorizing sharing of the data owned by the user at least in part toward a digital purchase and delivery of the service from the service provider by the user such that the data owned by the user serves as a transactional value for the digital purchase and delivery of the service as and when the data is made available. The pre-consenting system may further be configured to generate the electronic trigger that is initiated upon electronic receipt of the third computer-executable input by the pre-consenting system. The trigger contains a unique code referencing the user, the user system and the authorized data of the user for storage, processing, and sharing of the authorized data.

The pre-consenting system may be configured to generate the trigger that is initiated upon electronic receipt of the third computer-executable input by the pre-consenting system that is indicative of the user authorization for sharing at least one or more computer executable files containing the authorized data of the user.

The trigger may include a unique code referencing the user, the user system and the authorized data of the user for storage, processing, and sharing of the authorized data.

The pre-consenting system further includes a processing circuit to process the data associated with the user system as a response to a request made by the service provider system for authorization of use of the data against a service provided by the service provider system digitally. The processing circuit may further include at least one of a data recognition device, an audio signal recognition device, a video signal recognition device, and a fingerprint identifier input device. The at least one of the data recognition device, the audio signal recognition device, the video signal recognition device, and the fingerprint identifier input device may be configured to process the data digitally coming from the user system as a response to a request made by the service provider system for the authorization of the data usage against the service charge for the service provided by the service provider system.

The data recognition device may include a programmable electronic device which may be configured to automatically recognize and capture user associated information including one or more of an associated phone number, and an associated email address of the user and associated with the user system to serve as an input for initializing payment by the payment engine.

The data recognition device may include a programmable electronics device which may be configured to recognize and capture user associated information including one or more of an associated phone number, and an associated email address of the user and associated with the user system to serve as an input for initializing payment by the payment engine.

The fingerprint identifier input device may include a programmable RF (radio frequency) device reader to capture the response from the user system and record it for later use as the authorization for sharing the user data by the service provider system in exchange of the digital service delivery to the user.

The pre-consenting device may be programmed to generate at least one of a random number, a checksum, and a cryptographic code using at least one of a randomization function, and a checksum function, and a cryptographic hash serving as an authorization token transmitted by the pre-consenting device to the service provider system processing the payment by the payment engine and sharing the user data.

The system may further include a data valuation device configured to evaluate the worth of the approved data owned by the user and received by the service provider system and authorized for sharing by the user, wherein the worth of the approved data may be calculated based on a set of predefined criteria specified for a set of data types, data entities and data attributes so that the delivery of the service may be defined in terms of transactional values payable through the user data by the user upon authorization through the pre-consenting system.

The system may further include a data extraction device to pull the data from the service provider system, contained in a central data center, corresponding to the user that has been authorized for transaction by the user system. The payment engine may be enabled through a banking procedure for processing digital transactions. The payment engine may be enabled through a blockchain-enabled component for processing digital transactions.

The system may include a blockchain device to process blockchain tasks through blockchain-enabled and computer-controlled software and hardware tools, wherein the blockchain device may be located at a location remote from locations of the user system and the buyer system. The blockchain device may be coupled to a blockchain database that is located at a location remotely from the locations of the user system and the buyer system. The blockchain device further includes a processing device to process blockchain tasks through computer-controlled software and hardware tools.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
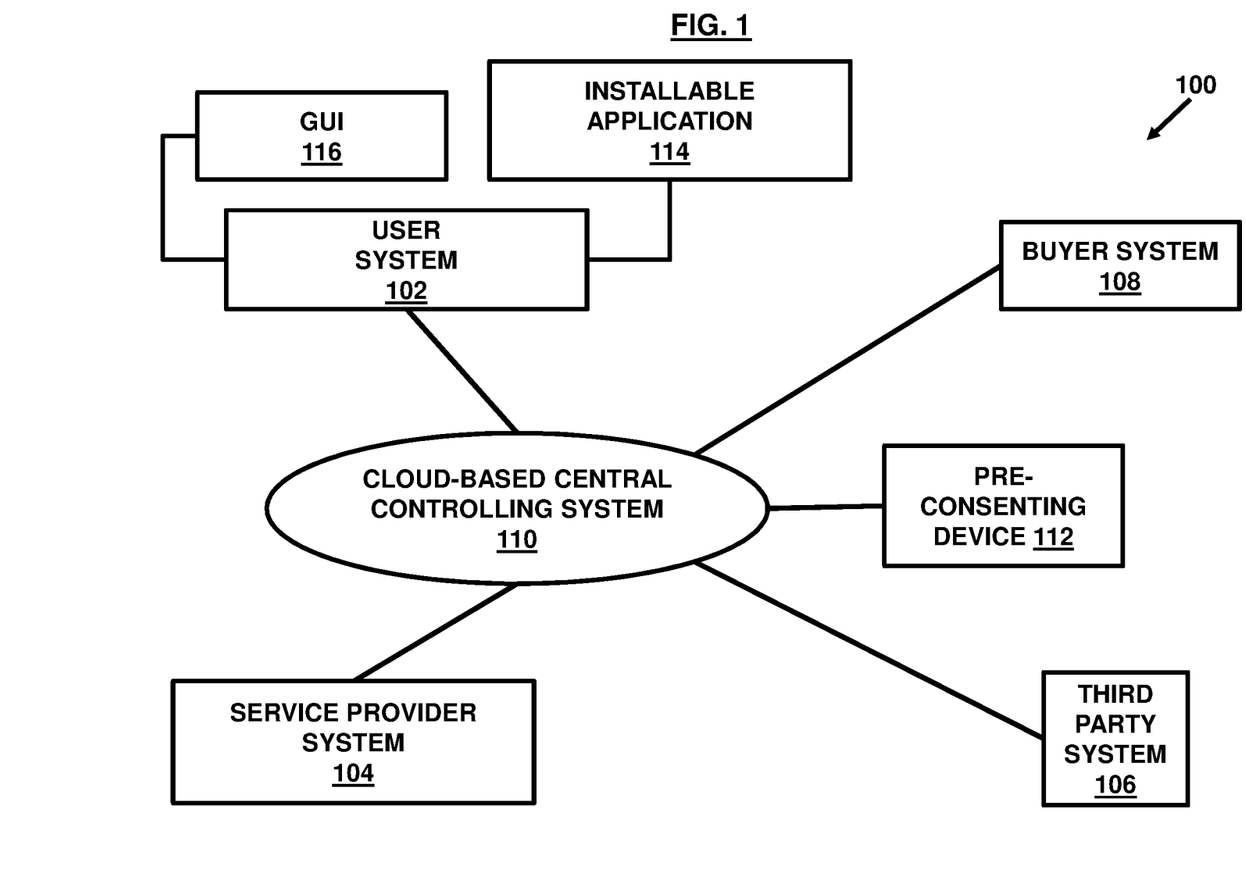
FIG. 1 illustrates an example of an environment or architecture in which various embodiments herein may operate.

FIG. 1 illustrates a schematic diagram of a system 100 for authorization of data usage and/or sharing corresponding to a user associated with a user system 102 by a service provider or a service provider system 104 in exchange of one or more services delivered to the user. The system 100 may include the user system 102 associated with the user, the service provider system 104 associated with the service provider, a third party system 106 associated with a third party such as an insurance agency (and the like without limitations), and a buyer system 108 associated with a buyer. The system 100 may further include a cloud-based central controlling system 110 and a pre-consenting device 112.

In an exemplary scenario, when the user system 102 submits a request for a service delivery to the service provider system 104, the service provider system 104 associated with the service provider may in turn generate a request for the user system 102 to provide a user consent for usage of the user data (referred to as data simply interchangeably without limitations) through the pre-consenting device 112 which records the response of the user system 102 and acts accordingly. The pre-consenting device 112 is discussed later.

If the user system 102 provides the user consent (referred to as consent simply interchangeably without limitations) to the service provider system 104, the service provider system 104 may process user details along with authorization details and submit them to the cloud-based central controlling system 110.

In an example, the service provider system 104 may interact with the buyer system 108 via the central controlling system 110 to evaluate user data worth (also referred to as value of the user data or transactional value of the user data) and inform the user system 102 accordingly. In an example, the service provider system 104 may interact only with the cloud-based central controlling system 110 to evaluate the user data worth and inform the user system 102 accordingly without any direct data exchange with the buyer system 108. The user data worth may be calculated based on a predefined set of criteria specified by the buyer system 108 for a set of entities and attributes so that delivery of the services can be defined in terms of transactional values payable through the user data by the user upon authorization via the pre-consenting system 112.

The entities and attributes are terms defined with respect to data models herein. For example, a person, organization, event, etc. may be considered as an entity and corresponding information fields for an entity such as a state, person's behavior and methods (if any) related to the entity are considered as its attributes. For example, if a person is an entity in a particular scenario, the data fields related to the person such as address, company the person works in, education of the person, etc. are respective attributes of the entity (person).

The buyer system 108 may be configured to communicate with the cloud-based central controlling system 110 (also referred to as controlling system 110 for the purpose of simplicity without limitations) to submit information stored as computer executable files in the controlling system 110 such that the information may be indicative of buyer interests for a plurality of data types and respective worth in terms of transactional values for purchase over a digital network through appropriate digital authorization by data owners, herein the user system 102 or the user. In an example, the computer executable files may store information pertinent to certain data types the buyer system 108 may want to approve digitally or may be interested in for purchase (called approved data types), data worth for each of the approved data types, authorization parameters that is criteria defining what data types matter or count valuable to the buyer system, data owner details and the like without limitations. The approved data types may be indicative of the data buyer interests in certain entities and types of attributes associated with the entities.

The transactional value of the attributes may differ depending on buyer preferences and valuation criteria for the attributes and the data types. For example, a buyer may approve medical reports for digital purchases; a loan provider may approve bank statements or other economic data and so on. In an example, the buyer system 108 may define the worth of each type of data it may be interested in on the basis of per entity per attribute basis while the value of the attribute may differ from one buyer system to another other buyer system. The buyer system 108 may approve a variety of data types, and each type of data (or data type) may be evaluated for its worth based on the specified criteria. For example, three entities with each of two attributes may be more valuable than one entity and two attributes.

The service provider system 104 may be configured to communicate the user data (authorized for sharing by the user) to the controlling system 110 which may then transfer the authorized data to the buyer system 108 or may make a promise to transfer the data to the buyer system 108 or the controlling system 110 depending on the availability of the data from the user. In an example, when the data is available, the service provider who is already authorized by the user for sharing the user data to the buyer system 108 can submit the data to the buyer system 108 directly or through the cloud-based central controlling system 110 which stores the user data received from the service provider system 104 when it is available.

The service provider system 104 may also interact with the third party system 106 such as the insurance agency (and the like without limitations) to calculate the billable transactional value for the services delivered by the service provider as per a user service plan such as a co-pay insurance program. Further, any service charge billed to the user against the delivered services may be paid in the form of the data which is converted into the equivalent transactional value based on calculation of the data worth for the user data authorized for sharing with the data buyer system 108 by the service provider system 104 and the amount of data defined as number of entities and number of attributed per entity.

In an example, if the user system 102 gives the user consent to the service provider system 104, the service provider system 104 may interact with the buyer system 108 via the central controlling system 110 and evaluate the user data worth (also referred to as value of the user data) and inform the user system 102 accordingly. The service provider system 104 may then transmit the user data to a central repository such as an electronic medical record (EMR) system 216 (shown in FIG. 2). The user data may then be allowed to be accessed or extracted for use by the buyer system 108 right after the authorization or may be promised to make a submission to transmit or share the user data to the buyer system 108 or the controlling system 110 for extraction by the buyer system 108 from the central controlling system 110 depending on the availability of the data.

In an example, the user system 102 may be configured as a system which is capable of communicating and providing the user consent to the service provider system 104 in the form of a variety of ways. For example, the user system 102 may be configured to provide the consent through a Short Message Service component (SMS), an audio signal, a video signal, a finger print identifier or in any other digitally readable form without limitations.

In an example, the user system 102 may include an installable application 114 that may be downloaded within the user system 102 by the user. In an example, the user system 102 may include a graphical user interface (GUI) 116 for operating various menu options and widgets for allowing to perform a variety of tasks causing the user system 102 to interact with the service provider system 104 including such as the authorization for accessing and/or using the user data for further selling or sharing to such as the buyer system 108. In an example, the variety of tasks may include reviewing credentials of the buyer system 108 through the graphical user interface 116 in the user system 102 and allowing or denying the authorization to the service provider system 104 for data usage rights by the buyer system 108 at least in part. In an example, the user system 102 may be allowed to define criteria for auto-authorization of certain data types for certain types of buyers so that whenever the data is available for the user, the service provider may automatically determine its applicability for authorization based on the criteria defined and accordingly utilize it for submission to the controlling system 110 or the buyer system 108. A notification may be generated for the user to verify once before a final release of the data in some embodiments.

In an example, the user system 102 may be a mobile device, cell-phone, laptop, desktop, or any other type of computer system capable of executing programmable instructions etc.

Figure 2:
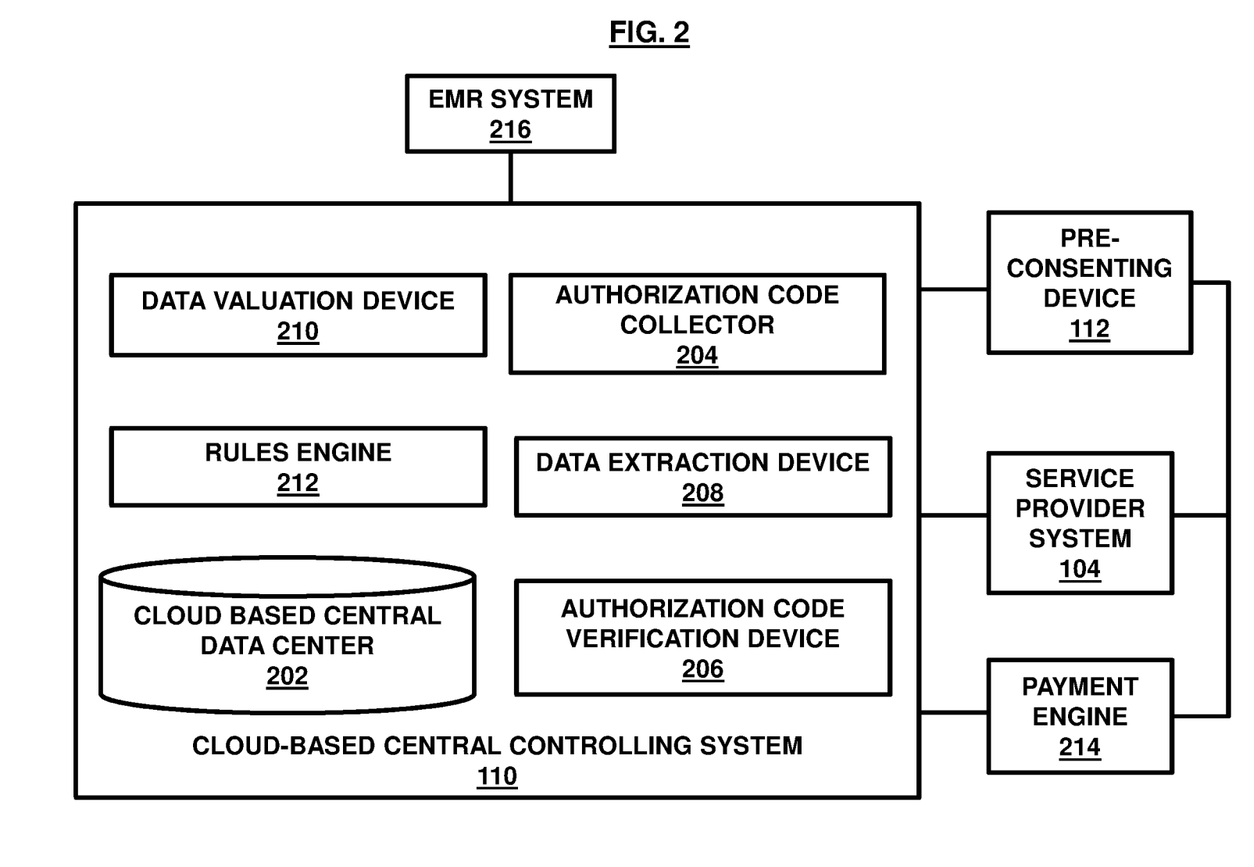
FIG. 2 illustrates a schematic diagram of a cloud-based central controlling system interacting with a pre-consenting device, a service provider system, and a user system in accordance with an embodiment herein.

FIG. 2, with reference to FIG. 1, illustrates a schematic diagram of the cloud-based central controlling system 110 interacting with the pre-consenting device 112, the service provider system 104, and the user system 102. The controlling system 110 may include a cloud-based central data center (or data center) 202, an authorization code collector 204, an authorization code verification device 206, a data extraction device 208, and a data worth valuation device (or simply data valuation device) 210.

The cloud-based central data center 202 is configured as a central repository which may be used to store the data coming from the service provider system 104 and from the buyer system 108 in the form of computer executable files. The central data center 202 stores the data in a structured way into different data types to calculate the data worth and for further transmission to the buyer system 108 as and when requested from the buyer system 108 based on the authorization and the availability of the user data stored digitally.

The authorization code collector 204 and the authorization code verification device 206 may together perform verification of the user entity and/or the buyer entity and associate the authorized data along with the services delivered digitally and the buyer system 108 to perform various processing tasks in order to successfully deliver the services to the user and submit the authorized data to the buyer system 108 and use the approved data as the transactional value for a payment transaction instead of making monetary payments for the services delivery. In an example, the authorization code collector 204 and the authorization code verification device 206 may be configured to verify the digital code (or identifier) coming from the user system 102 and from the service provider system 104 to indicate the service provider system 104 that the user is ready to trade the user data against the services requested by the user system 102 to the service provider system 104.

The data extraction device 208 may be configured to pull the data from the service provider system 104 or the controlling system-managed central data center 202 corresponding to the user that has been authorized for transaction by the user system 102. The pulled data is then structured into the plurality of data types and is transmitted to the central data center 202 for future actions/references and processing to be taken such as by the data value calculation device (or data valuation device) 210 and the like. The data extraction device 208 may also be configured to extract data from the central data center 202 stored in the form of the computer executable files and transmit them to the buyer system 108 as and when requested or made available by the service provider system 104. The extraction device 208 may be configured to extract and supply to the buyer system 108 only those computer executable files that belong to the user and contain the authorized data only. Any data from other than the user who provided the consent and any data that is not authorized by the user but belong to the user may be stored as separate computer executable files or referenced separately so that it does not get extracted and supplied to the buyer system 108 from the central data center 202.

The data worth calculation device or data valuation device 210 is configured to calculate the data worth based on the predefined criteria and preferences provided by the buyer system 108 and stored in a rules engine 212 contained within the control system 110. The data worth valuation device 210 may be configured to calculate and asses the data worth by using a preset algorithm stored in the rules engine 212 which is governed by a set of rules (predefined criteria and preferences) provided by the buyer system 108.

Referring to FIGS. 1 and 2, in an example, the system 100 may be configured as a computer-controlled payment system for facilitating seamless transactions from the user system 102 to the buyer system 108 through an intermediary system such as the service provider system 104 using the authorized data as the transactional value for performing digital transactions instead of the currency. The service provider system 104 may include a service interaction component to generate an electronic signal transmitted to the user system 102 using a transmission circuit. The electronic signal may allow communication between the user system 102 and the service provider system 104 such that the service interaction component allows to collect predefined information about the user system 102 and the associated user. The predetermined information may include without limitations such as a first computer-executable input indicative of an identifier of the user system 102 and the associated user, and a second computer-executable input indicative of a service sought for delivery in the service setting by the service provider 104.

The service provider system 104 may include a payment engine 214 for processing payments digitally based on the data worth associated with the data owned by the user and authorized for sharing by the service provider to the buyer system 108. The payment engine 214 may be configured to calculate a payable amount payable digitally by the user to the service provider based on a first digital transactional value indicative of a service charge for the service delivered digitally by the service provider, a second digital transactional value indicative of a predefined co-pay between the user and a co-pay entity such as the third party (insurance agency), and a third digital transactional value indicative of the data worth associated with the data owned by the user and authorized for sharing. As discussed above, the data worth may be calculated based on a set of predefined criteria specified by the buyer entity for a set of data types, data entities and data attributes by the data valuation device 210 which may be coupled to the payment engine 214.

The pre-consenting system 112 may be located remotely from the user system 102 in the service setting and may be configured to collect a third computer executable input indicative of an authorization for sharing the data owned by the user at least in part toward the digital purchase of the service from the service provider by the user such that the data owned by the user (approved data) serves as the transactional value for the digital purchase of the service as and when the data is made available to the service provider system 104—right away during the payment transaction in terms of the approved data or at a later time.

The pre-consenting system 112 may be further configured to generate a trigger that is initiated upon electronic receipt of the third computer-executable input by the pre-consenting system 112. The trigger may include a unique code referencing the user, the user system 102 and the authorized data of the user for storage, processing, and sharing of the authorized data.

Figure 3:
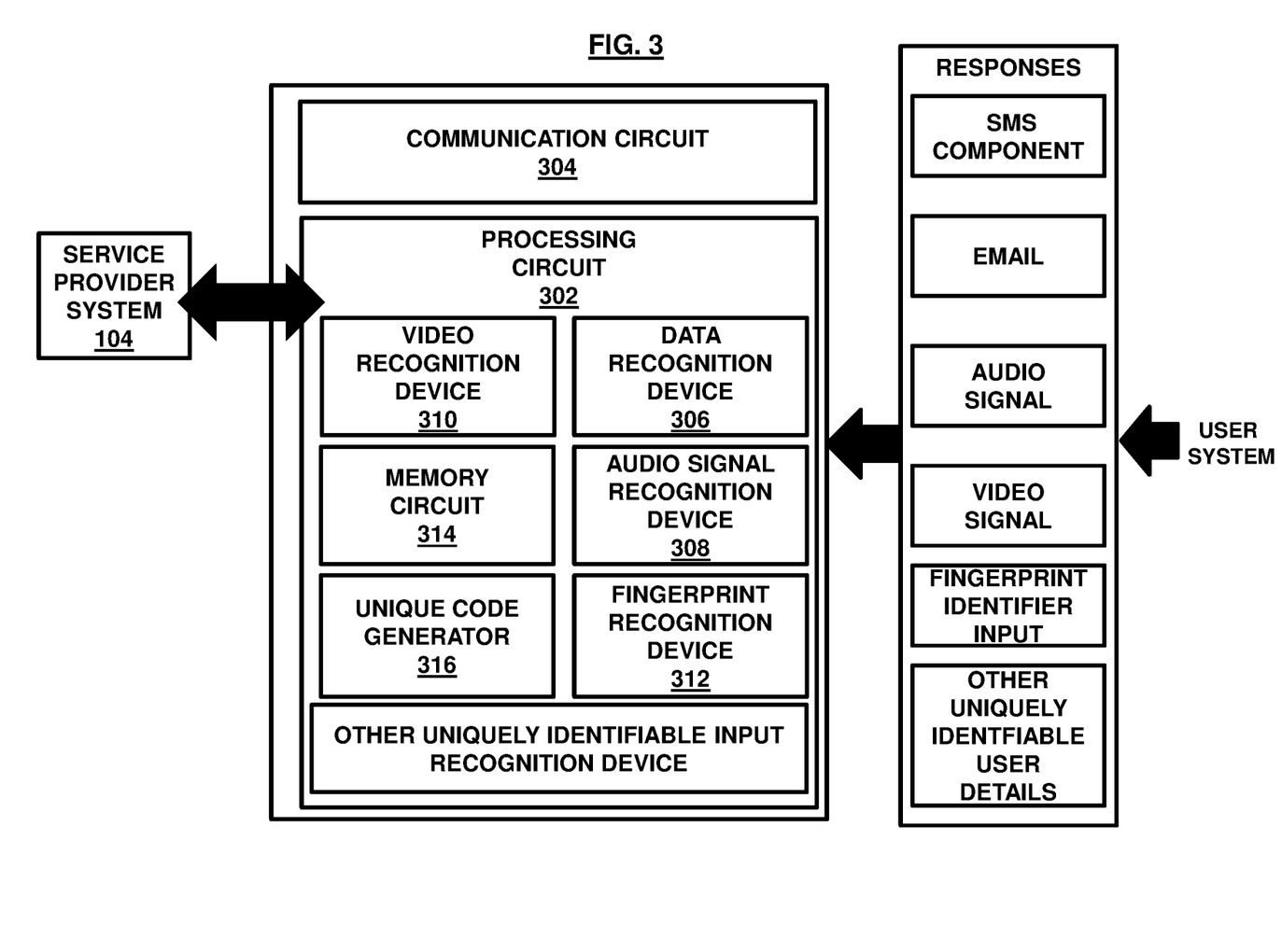
FIG. 3 illustrates a schematic diagram of the pre-consenting device such as shown in FIG. 2 in accordance with an embodiment herein.

FIG. 3, with reference to FIGS. 1 and 2, illustrates a schematic diagram of a pre-consenting device 112 such as the pre-consenting device 112 shown in FIG. 2. The pre-consenting device 112 includes a hardware communication circuit 034 and a hardware processing circuit 302. The processing circuit 302 may further include a data recognition device 306, an audio signal recognition device 308, a video signal recognition device 310, a fingerprint identifier input device 312, other uniquely identifiable input recognition device, a memory circuit 314 and a unique code generator 316.

The processing circuit 302 may be configured to process the data coming from the user system 102 as a response to the request made by the service provider system 104 for the authorization of the data usage against the service charge provided by the service provider system 104 instead of paying with cash or other form of conventional currency either digitally or non-digitally. In another scenario, the user system 102 may voluntarily authorize the service provider system 104 to use the data against the services instead of waiting for the request from the service provider.

The unique code generator 316 may be configured to generate a unique code (identifier) for the user system 102 (such as the unique code mentioned above created when the trigger is initiated) by recognizing the user system 102 response with the help of various recognition devices present in the pre-consenting device 112 as mentioned and discussed later in the document. In an example, the unique code generator 316 may be programmed to generate a random number or a checksum or a cryptographic code using randomization function or checksum function or cryptographic hash function accordingly. The unique code generated may be used as the user system 102 identifier for any future transaction or processing or referencing. The user system 102 may use the unique code as an authorization token for the usage of user data against the services provided by the service provider system 104 instead of paying with currency.

The communication circuit 304 may be configured to establish a communication channel to and from the pre-consenting device 112 and/or the service provider system 104. The communication circuit 304 may allow communication between different systems as shown in the FIGS. 1 through 3 by establishing either a physical transmission medium or a logical connection over a multiplexed medium such as a radio channel in telecommunications and computer networking or any other modes without limitations. Communication circuits are characterized by specific standard criteria, such as the frequency bandwidth and information transmission rate, etc.

The data recognition device 306 in the processing circuit 302 of the pre-consenting device 112 may be configured to recognize and capture unique data (information) about the user system 102 and the user, the authorization response is coming from. The data recognition device 306 may be any programmable electronics device which recognizes and captures the basic information such as phone number, email address etc associated with the user system 102 or the user and serve as an input for initializing payment methods according to embodiments.

In an example, the authorization from the user system 102 may arrive in the form of an SMS (Short Messaging Service Component). The data recognition device 306 may recognize the phone number of the device used for sending the SMS and store it somewhere in an internal memory or a separate memory circuit 314. The phone number may directly be transmitted to the service provider system 104 which may be used as a proof of consent or the unique code generator 316 may generate a unique code such as the code mentioned above for the associated phone number which may be used as the authorization token for the user system 102 for usage/sharing of the approved data against the services provided by the service provider system 104 in return of the authorized data instead of paying with currency digitally or non-digitally.

In an example, the user system 102 may provide the user consent through email. The service provider system 104 may use the email address as a proof of consent after verification or may route it to the unique code generator 316 to generate the unique code which may be associated with the user system 102 as the authorization token for the usage of data against the services provided by the service provider system 104 instead of paying with conventional currency forms digitally or non-digitally.

The audio signal recognition device 308 may be configured to recognize an audio signal coming from the user system 102. The recognition process may be performed by using statistical models that may output a sequence of symbol or quantities by breaking the input audio signal into piecewise stationary signal and comparing them with piecewise stationary signals of the audio signal present in the service provider system 104 in a database such as the central data center 202. In other scenarios, the recognition device may convert the audio signal coming from the user system 102 into textual form and transmit it to the controlling circuit 110 through the communication circuit 304 which may use it as token of consent to use the user data as the transactional value for the digital purchase and delivery of the services.

The video signal recognition device or video recognition device 310 may be configured to recognize a video signal coming from the user system 102. The recognition process may be performed by using statistical models that may output a sequence of symbol or quantities by breaking the input video signal into piecewise stationary signal and comparing them with piecewise stationary signals of the audio signal present in the service provider system 104 in a database such as the central data center 202, in an embodiment. In one scenario, the video recognition device 310 may convert the video signal coming from the user system 102 into textual form and transmit it to the controlling circuit 110 through the communication circuit 304 which may use it as token of consent to use the user data as the transactional value for the digital purchase and delivery of the services.

In an exemplary embodiment, the pre-consenting device 112 may be configured as a programmable RF (radio frequency) device reader without limitations which may be configured to capture the user system 102 response and record it for later use as the authorization input. The pre-consenting device 112 may be programmed to generate a random number or a checksum or a cryptographic code using randomization function or checksum function or cryptographic hash function accordingly. The cryptographic code (say the authorization token) may then be transmitted by the pre-consenting device 112 to the service provider system 104 and to the authorization code collector 204 of the controlling system 110. The authorization code collector 204 may be a simple programmable data logger which may be configured to take input from the pre-consenting device 112 and store it for further transmission and processing. The authorization verification device 206 may be configured to be a simple programmable electronic device which may compare the two authorization tokens—one coming from the authorization code collector 204 and the other from the service provider system 104 to perform verification of the authorized data for a particular user such as the user system 102 herein in some embodiments. After comparing the two tokens bitwise and if the tokens match, the authorization checker 204 may send a single bit 1 to the service provider which in turn may send a verification code which may be a data file identifier of the user in the data center 110 to the data extraction device 208. The data extraction device 208 may be any web-based Extract, Transform and Load (ETL) tool which may extract the data, transform it into structured data and then load it to the cloud-based central data center 202 in a structured form.

Figure 4:
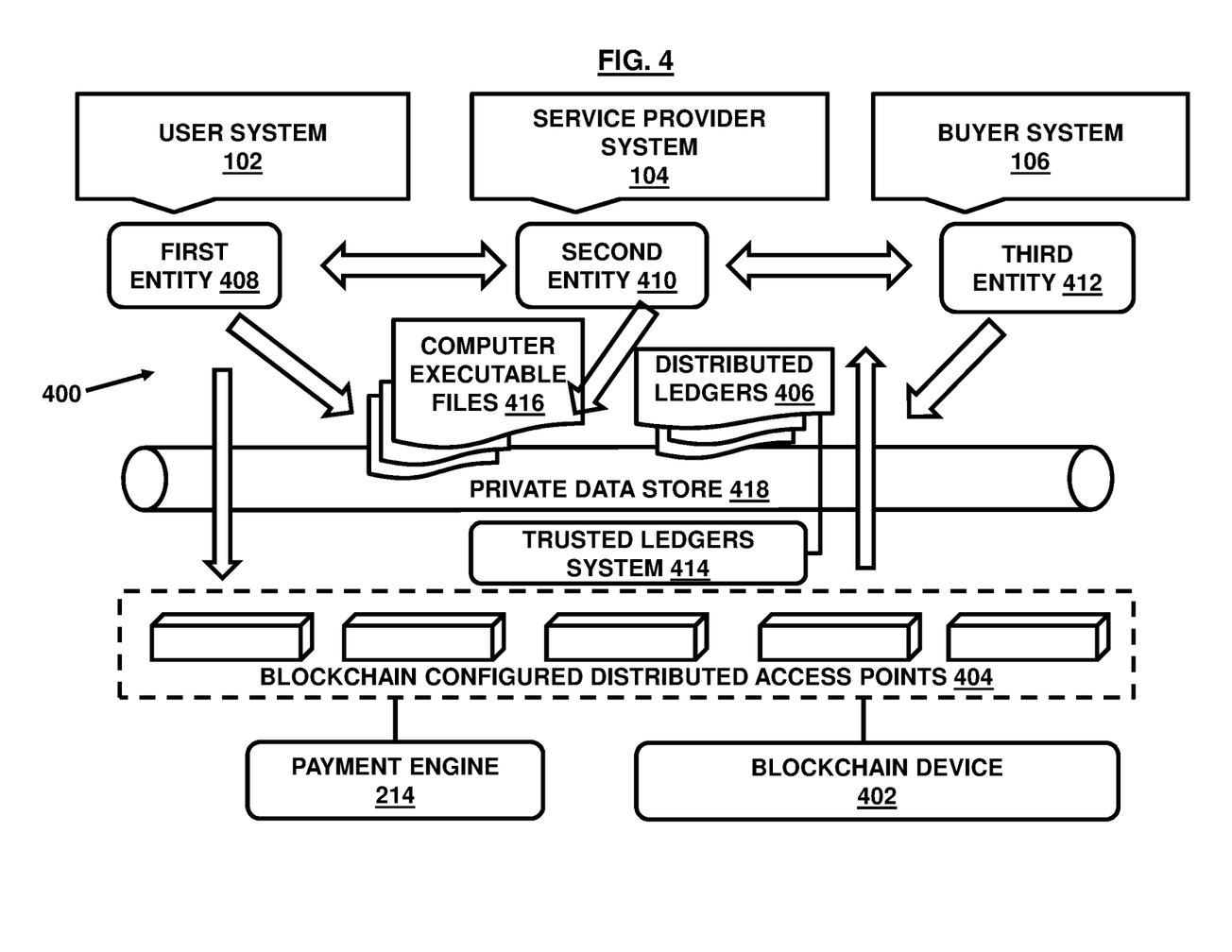
FIG. 4 illustrates blockchain computer architecture of the system of FIG. 1 along with other systems in accordance with an embodiment herein.

FIG. 4, with reference to FIGS. 1 through 3, illustrates a blockchain computer architecture of the system 100 of FIG. 1 along with other systems and components in accordance with an embodiment herein.

FIG. 4 illustrates an exemplary blockchain configured ecosystem architecture 400 containing one or more components of the system 100 as discussed in conjunction with FIG. 1 and also contain additional components so as to allow integrity of transactions and the data processed during the service delivery as discussed above in the document. The blockchain configured ecosystem architecture 400 may provide a crowdsourced integrity network for storing the data authorized for sharing by the user along with other user and service details instead of locally stored information by different participants that may be tempered.

The ecosystem architecture 400 may be blockchain configured involving various blockchain devices. For example, the user system 102, service provider system 104, and the buyer system 106 may all interact with a blockchain device 402 through a plurality of blockchain devices configured distributed access points 404. A network that facilitates interaction across all components may be a blockchain integrity network. The blockchain network may build trust among the various participants or entities and their associated computing terminals or devices even if the devices/terminals etc. may not know one another. The blockchain network may allow connections and transactions and recording and sharing of the data and various codes/token generated during an entire transaction including service tokens and authorization tokens in a trusted mode. A record of transactions and sharing and data from various terminals/ devices stored on the blockchain in the form of computer executable distributed ledgers 406 may provide proof to command the necessary trust among the terminals/devices (such as those associated with various participants including a first entity 408 such as the user, a second entity 410 such as the service provider, and a third entity 412 such as the buyer) to cooperate through a peer-to-peer or peer-to-client distributed digital ledger technology. The ecosystem architecture 400 may include a distributed trusted ledgers system 414 containing the distributed blockchain ledgers 406 associated with a plurality of computing terminals and devices such that each ledger stores a copy of computer executable files 416 containing the authorized data corresponding to the user for the service delivery and the trust notes for defining security and trust among the computing terminals and devices across the network so that each computing terminal trusts the other computing terminal through the blockchain. The distributed ledgers system 414 enables coding of rules-based contracts that execute when specified conditions are met. The distributed ledgers 406 make it easier to create cost-efficient networks where any device or any evidence associated with a service delivery or data authorization or payment transaction may be tracked, without requiring a central point of control.

The various computing terminals or devices in the network serve as distributed peer-to-peer nodes and connections. The payment engine 214 may serve as a client device configured to perform the task of processing payments through the blockchain network based on the rules as defined based on the calculated worth of the data and the service charge and other details as necessary and defined by the rules engine 212. Each terminal/device/node in the ecosystem architecture 400, etc. may receive a copy of the blockchain which may get downloaded automatically upon joining the blockchain integrity network. Every node or the device in the network is an administrator of the blockchain, and may join the network voluntarily so that the network is decentralized.

The blockchain may eliminate the risks that come with data being held centrally by storing data across the network which may include the computer executable files containing the authorized data and/or the various tokens/codes including payment transaction codes. The blockchain security use encryption technology and validation mechanisms for security and integrity verification. The security may be enabled through public and private keys. A public key may define a user's address on the blockchain. The private key may give its owner an access to various digital assets in the network.

In an embodiment, the distributed ledgers 406 may enable coding of smart contracts that will execute when specified conditions are met. These smart contracts may protect various information pieces associated with the service deliveries and payment transactions and data processing/storage and eliminate the risk of files copying and redistribution without protecting privacy rights.

The blockchain configured ecosystem architecture 400 may provide a private view for the various devices and the entities operating in the network through the private data store 418 so that each such device may privately access the computer executable files 416 associated with a service delivery based on various policies such as based on their respective identities. Each of the devices may access the computer executable files 416 through the dedicated private store 418 available through the plurality of distributed blockchain configured access points 404 which may be enabled in the form of distributed blocks as shown in FIG. 4, with each block providing a facility to access the features of the blockchain configured ecosystem architecture 400 by different terminals and devices at the same time based on defined and granted access rights.

The private data store 418 may provide a virtual storage to facilitate interaction, information exchange, reviewing, and presentation of the computer executable files 416. For example, the private data store 418 may allow a virtual storage and presentation of only limited executable files or portions of the executable files for access by particular nodes in accordance with permissions granted for reviewing. The private data store 418 may be configured to auto-hash review interactions at any required interval. This compartmentalization of the computer executable files 416 ensures that the computer executable files 416 are secured and private as per access rights authorized to the nodes. The data presented on the private data store 418 of the blockchain serves as a secure way to ensure that the private data store 418 is in sync with any permissioned access.

In an embodiment, the user system 102, the service provider system 104, and the buyer system 106 may be allowed to access discrete portions of data elements including the computer executable instructions stored within the blockchain device 402 based on access rights through respective blockchain access points such that an access to the data elements allows one or more of viewing, locally replicating, and digitally sharing the data elements at least in part.

In an embodiment, the blockchain configured digital ecosystem architecture 400 may provide a federated blockchain comprising of several entities/participants and their associated computers and devices and sensors that jointly interact to process transfers of data through a trusted, secured and distributed network of the blockchain configured access points 404.

In accordance with various embodiments, the service setting may be defined based on various parameters. For example, the service setting may be defined by a particular geo-location such as through latitude and longitude values. In an embodiment, the service setting may be defined through geo-fencing. Geo-fencing (geo-fencing) may allow a software program and associated hardware to use a global positioning system (GPS) or radio frequency identification (RFID) device to define geographical boundaries that may be indicative of the service setting.

Geo-fencing may allow an administrator to set up triggers so that when a device such as the user system enters (or exits) the boundaries defined by the administrator through geo-fencing, an alert may be generated or the trigger may be generated for initiation or closing of the service.

In an embodiment, the service setting may be defined based on either of the first entity and the second entity to be proximate to the other entity. The proximity may be associated by pre-defined location coordinates or geographical barriers or distance values. For example, if an entity enters within a radius of 30 yards of the other entity, the two entities may be considered proximate enough to be considered within the service setting at the same time. The geographical boundary in this case may be a 30 yard radius, as an example. The service setting in this case may be identified by either of the entities to enter within the geographical boundary. For example, if one entity moves proximate to the other entity, the service setting may be defined. The service setting may be defined as long as both the entities are within the geographical boundary in accordance with the pre-defined location coordinates or the geographical barriers or the distance values.

Figure 5:
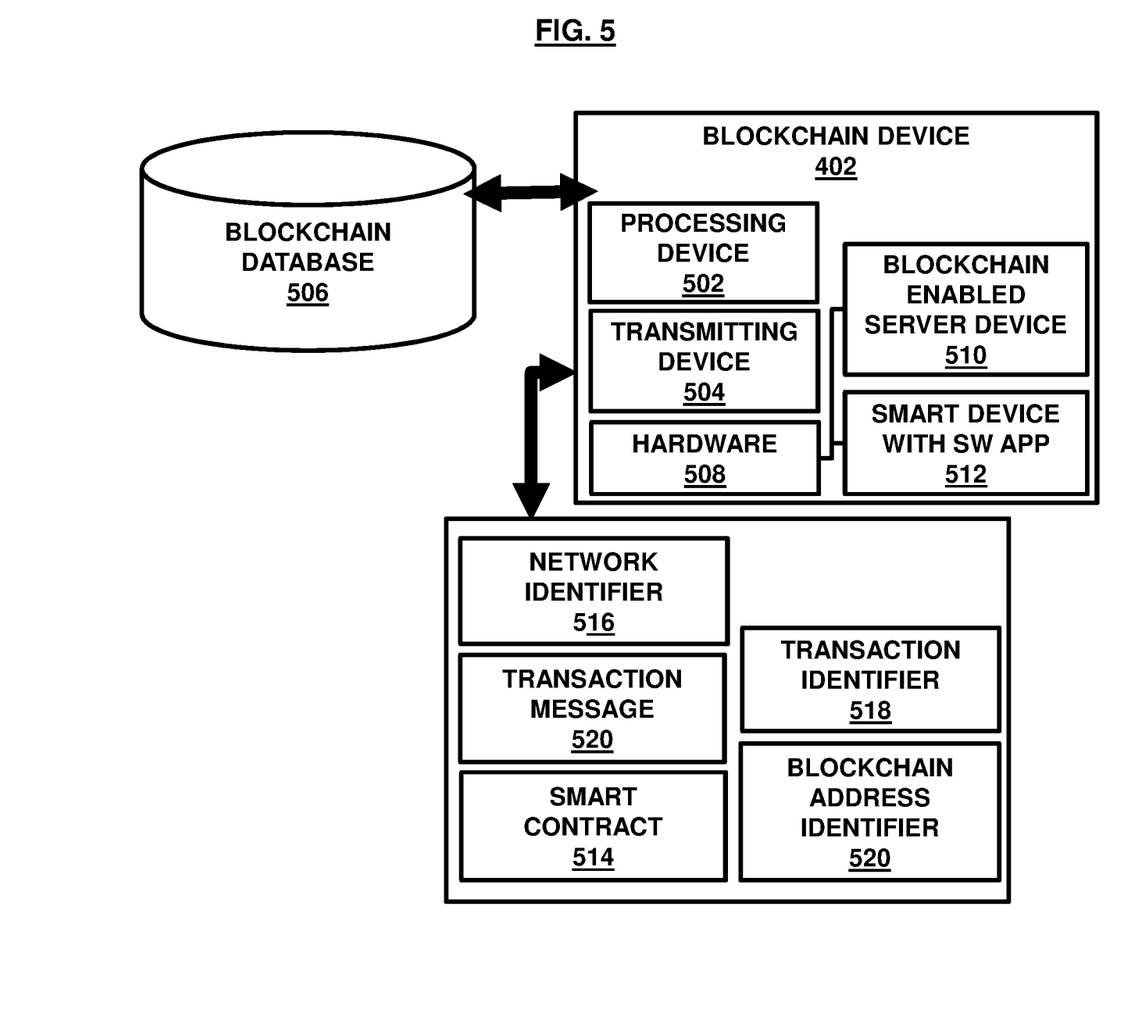
FIG. 5 illustrates an exemplary blockchain device in accordance with an embodiment herein.

FIG. 5, with reference to FIGS. 1 through 4, illustrates an exemplary blockchain device such as the blockchain device 402. The blockchain device 402 is configured to automatically store computer executable instructions such as the digitally executable tokens pertaining to authorization and payment as discussed above.

The blockchain device 402 may include a processing device 502 and a transmitting device 504 that each is capable of blockchain integration unlike generic devices. The processing device 502 may process all blockchain tasks through computer-controlled software and hardware tools. The transmitting device 504 can allow transmission of information such as the computer-executable files from the central data center 202 which may be configured as a blockchain database 506 to the buyer system 106 or the controlling system 110 based on permissions and access rights. The transmitting device 504 may also enable various types of communication with other systems.

The blockchain device 402 also includes hardware 508. The hardware 508 may comprise a specific blockchain-enabled server device 510 and a smart device 512 running a specific dedicated software application. The smart device 512 is configured to engage in specific communication with the blockchain-enabled server device 510. The smart device 512 is configured to receive inputs from the user and generate transaction identifiers based on the received inputs such that the transaction identifiers enable processing and generating of smart contracts 514 within the blockchain that may involve authorization and payment processing without limitations based on the services delivered as well as the worth of the authorized data. The smart contracts 514 cannot be tempered and provide security from any sort of vulnerability within the blockchain. The smart device 512 may be coupled to a user interface that allows the user to input details.

The blockchain-enabled server device 510 performs tasks enabling communication with the smart device 512. The blockchain-enabled server device 510 further performs at least one of these tasks: storage of at least one database or a portion thereof and/or data for placement therein in the blockchain database 506, access the at least one database including the blockchain database 506, update the at least one database including the blockchain database 506, allow the smart device 512 to access and receive information in whole or in part from the at least one database. In some embodiments, the at least one database such as the blockchain database 518 may contain at least one unique hash, at least one timestamp of the at least one unique hash, and/or other data for generating the smart contracts 514.

The transmitting device 504 may allow transmission of at least one hash file and/or hash blockchain to the blockchain-enabled server device 510. The transmitting device 504 may further allow receiving a transaction confirmation and/or identifier from the smart device 512, creating a hash file and/or hash blockchain from the digital data and/or digital content, receiving the hash file and/or hash blockchain and the timestamp from the smart device 512. The processing device 502 may compare the hash file and/or hash blockchain to other verification information for verifying authenticity of a variety of information.

The processing device 502 may generate a network identifier 516, a transaction identifier 518, and a blockchain address identifier 520 to specify a particular transaction that involves such as receipt of a service associated with the user, enabling a payment corresponding to a service, submitting a workflow task, receiving responses for a particular workflow task of the service and other types of transactions. Each set of identifiers define a specific transaction indicated through a digital contract such as the smart contract 514 and cannot be tempered. The smart contract 514 allows tracing evidences of the transactions for any particular task. In an embodiment, the processing device 502 is configured to cause the smart contract 514 to be generated based on the network identifier 516, transaction identifier 518, and the blockchain address identifier 520 such that the smart contract 514 is configured to automatically validate a transaction using a special key associated with a user or a transaction.

A transaction message 520 may be generated by the processing device 502 to inform respective users. In an embodiment, the transaction message 520 may be associated with one or more secured hash links so that the transaction message is generated when the one or more secured hash links are activated.

The processing device 502 may generate the network identifier 516 that may be associated with the blockchain and the transaction ID (identifier) 518. The processing device 502 may generate the blockchain address identifier 520 using at least a unique key and one or more hashing codes associated with the respective user.

In an embodiment, the blockchain address identifier 520 may be based on a public key corresponding to a private key that was used to register the transaction on the blockchain such that the public key and the private key are part of a public/private key pair associated with the transaction indicative of the execution of a particular workflow task of the service.

In an embodiment, the processing device 502 may generate the transaction message 520 based on one or more standards and includes a plurality of data elements, including at least a first data element configured to store a proof of transaction as the evidence reserved for private use upon request for verification by respective associated users. The use of evidence privately is indicative of a controlled and secured access of the evidence only to authorized users.

The blockchain device 402 may include or is coupled to the rules engine 212 that defines and facilitates processing of a set of computer-executable rules defining instructions for verification of identity information of the user system 102 and the associated user. The computer-executable rules may allow verifying identity of the user and the user system 102. The rules engine 212 may include or be coupled to a memory circuit, a processing circuit, integrated circuits, chipsets, and rules translators (not shown). The rules engine 212 includes at least one rule that allows identifying the user and verification information of the user to consider authorization for the data owned by the user for sharing with the buyer system 106. The blockchain device 402 may be accessed through an interactive graphical user interface for interactions and engagement.

Figure 6:
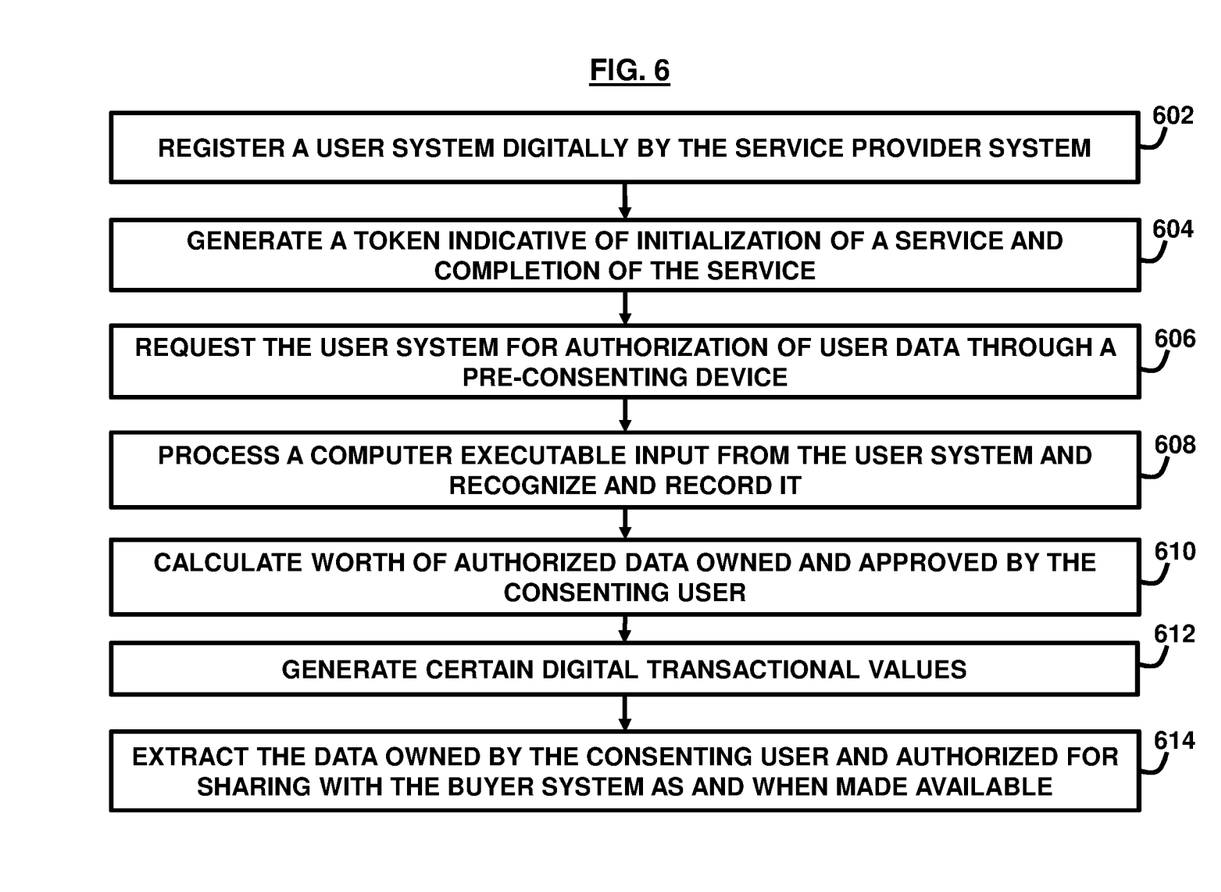
FIG. 6 is a flowchart illustrating a method for facilitating digital transactions in a service setting in accordance with an embodiment herein.

FIG. 6, with reference to FIGS. 1 through 5, is a flowchart illustrating a method for facilitating seamless transaction from the user system 102 to the buyer system 108 through the service provider system 104 operating over a digital framework in accordance with the invention for delivery of certain services either digitally from a remote location or physically at the service setting. The method allows a payment mode for making transactions between the user system 102 and the buyer system 108 against the service charges for the services provided by the service provider system 104 by using the user data as currency after authorization.

At step 602, the method includes registering the user system 102 digitally or manually by the service provider system 104 through the pre-consenting device 112 which collects the first computer executable input and second computer executable input. The first computer executable input is indicative of the identifier of the user system 102 and the associated user and the second computer executable is indicative of the service sought for delivery in the service setting or remotely through digital modes by the service provider system 104.

At step 604, the service provider system 104 may generate a token indicative of initialization of the service and the completion of service.

At step 606, the service provider system 104 may request the user system 102 for the authorization of the user data through the pre-consenting device 112. In an embodiment, the user system 102 may voluntarily authorize the service provider system 104 for sharing of the authorized data with the buyer system 108. The pre-consenting device 112 of the service provider system 104 may record the third computer executable input as discussed above which is indicative of the authorization from the user system 102 for sharing the data owned by the user at least in part toward the digital purchase of the service from the service provider by the user such that the data owned by the user serves as the transactional value for the digital purchase of the service as and when the data is made available. The third computer executable input from the user system 102 may be a SMS component, an e-mail, an audio signal, a video signal, a fingerprint identifier, or may be any other uniquely identifiable user detail in a digital format.

At step 608, the processing circuit 302 of the pre-consenting device 112 may process the third computer executable input coming from the user system 102 and recognize and record it with the help of various recognizing devices available in the processing circuit 302 such as the data recognition device 306, the audio signal recognition device 308, the video signal recognition device 310, and the fingerprint recognition device 312, etc as discussed above.

At step 610, the data valuation device 210 or the payment engine which is coupled communicatively with the service provider system 104 may calculate worth of the authorized data owned and approved by the consenting user. The data worth may be calculated based on the set of predefined criteria specified by the buyer entity for the set of data types, data entities and data attributes discussed above.

At step 612, the payment engine 214 may generate certain digital transactional values. The first digital transactional value may be indicative of the service charges for the services provided by the service provider system 104. The second digital transactional value may be indicative of a digital co-pay between the user and a co-pay entity. The third transactional value may be indicative of the data worth associated with the data owned by the user and authorized for sharing with the buyer entity to calculate the payable amount payable digitally by the user system 102 to the service provider system 104.

The user system 102 may not need to pay the service provider system 104 in currency or may even collect some extra points or money depending on whether the data worth is greater than, less than or equal to the payable amount for the services provided by the service provider system 104 after deducting the co-pay amount.

At step 614, the data extraction device 208 may extract the data owned by the consenting user and authorized for sharing with the buyer system as and when made available.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
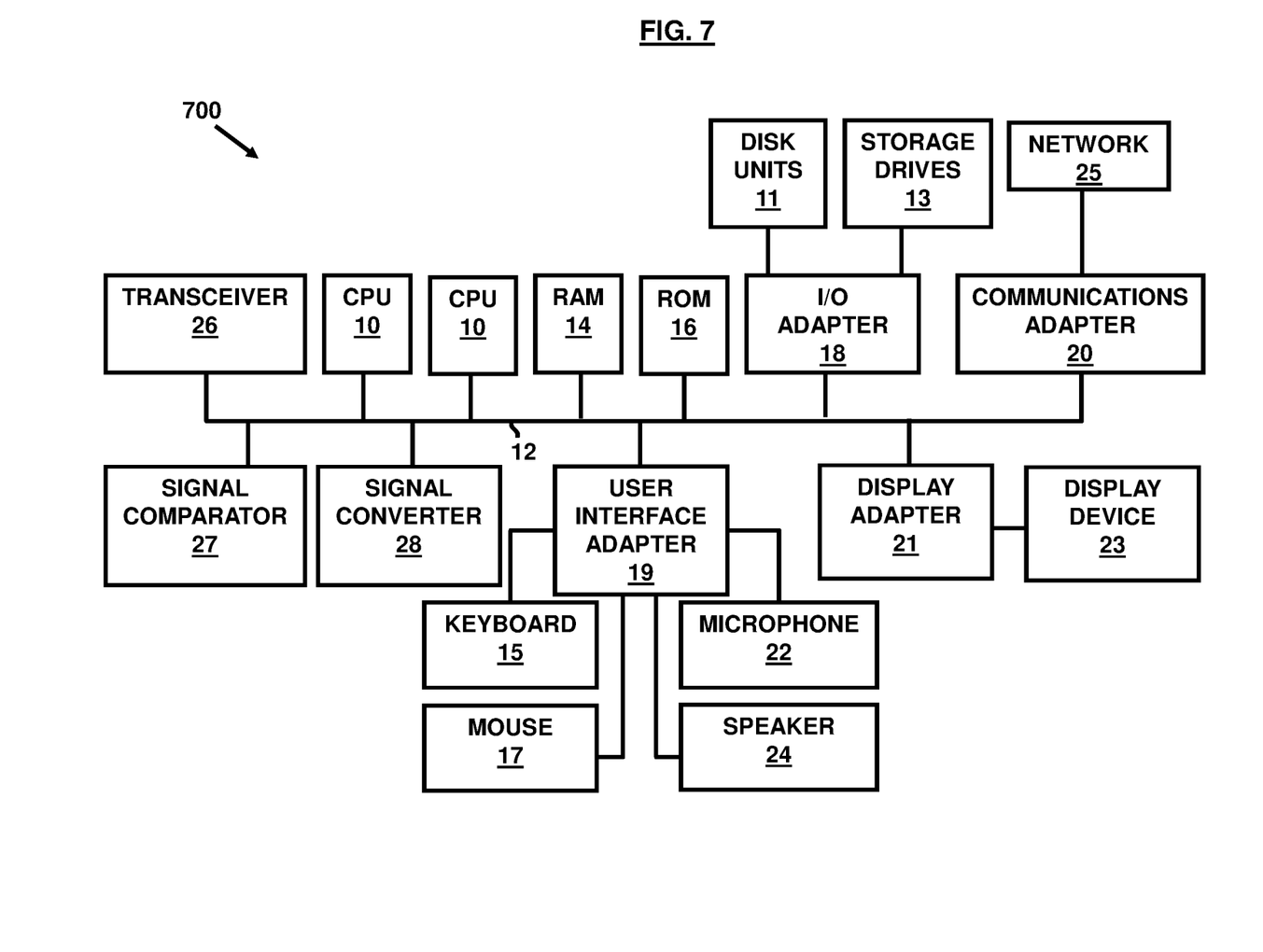
FIG. 7 is a block diagram illustrating a computer system according to an embodiment herein.

A representative hardware environment for practicing the embodiments herein is depicted in FIG. 7, with reference to FIGS. 1 through 6. This schematic drawing illustrates a hardware configuration of an information handling/computer system 700 in accordance with the embodiments herein. The system 700 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 700 can read the inventive instructions on the program storage devices and follow these instructions to execute the methodology of the embodiments herein. The system 700 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

In accordance with various embodiments discussed above, a guaranteed electronic transaction may be ensured without fail. The transaction may involve data that is allowed to be accessed and shared by the service provider in return of the service with no monetary payment processed. In some cases, the transaction may involve a part payment to be conducted in terms of currency if the service charge is more than the worth of the data. In some cases, the user may receive some incentives or money in case the service charge is less in amount than the worth of the data authorized by the user. In such cases, therefore, a financial account such as a bank account associated with the user corresponding to a financial institute may be associated with the user or the user system for guaranteed monetary transaction as needed. In order to avoid any fraudulent or erroneous transactions, the payment engine 24 that is blockchain configured may perform a series of steps including such as storing account profile of each user system 102, with each profile including an account number and balance in the account of the user associated with the user system 102. The steps may include receiving a transaction message from a financial institution involved with the payments processed through the payment engine 24, if any, in case an amount is deducted from the account of the user after delivery of the services. The message may include a specific account number, transaction amount, and payment guarantee information. With each such message, a transaction amount may be deducted (which can be zero if the worth of data is equal to the service charge or negative that is amount is received if the worth of the data is more than the service charge) which can be verified from the account balance in the specific account profile of the user. Accordingly, a record of payment guarantee that includes the transaction amount and data associated with the payment guarantee data may be generated and stored in the blockchain. The blockchain may also store a return message received from the financial institution that may include a response code indicating transaction approval and data associated with the generated record. The return message may be stored in the blockchain and cannot be tampered with. Most of the payment modes are still dependent on traditional financial instruments such as cash and credits. The payment process and system reduce dependencies of these service providers on such traditional financial instruments and thereby facilitating worthy digital data to become as a widely accepted payment mode against service. With an involvement of the data as traded across various entities and utilized as a transactional value for digital transactions, the blockchain architecture not only ensures a safe and secured mode of transaction, wherein each transaction involving at least one of data authorization, data access/sharing, monetary transaction, is recorded over the blockchain through smart contracts that cannot be edited or tampered by any of the involved or not involved entities. Recording these transactions through the blockchain eliminates human error and protects the data from possible tampering. Public ledgers that record everything in a secure and transparent manner provide a decentralized structure. Unlike banks that facilitate transactions with traditional currencies, the blockchain allows a free transfer of virtual currency (herein defined in the form of data worth) through a decentralized environment. All the data is then held in an interlinked network of computers, owned and run by none other than the users themselves. This reduces dependency on individual computers too. Even if some machines stop functioning, there is no affect on the blockchain data. This increases overall efficiency and performance of the entire computer-controlled blockchain enabled system involving a plurality of machines or computer systems. For example, if an irregularity is noted somewhere in the computer-controlled blockchain network, the blockchain can lead one all the way to its point of origin. This makes it easier to carry out investigations and execute necessary actions to rectify nodes causing issues. Further, the smart contracts can be automatically validated, signed and enforced through a blockchain construct. This eliminates the need for mediating systems and therefore saves resources and time.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer-controlled payment system for facilitating seamless transactions from a user system to a buyer system via an intermediary system, the system comprising:
    an electronic service provider system associated with a service provider and located physically in a service setting that includes one or more central servers, data stores, and cloud-based computing components for managing and processing delivery of a service in the service setting by the service provider to the user associated with the user system, wherein the service provider system comprising:
        a service interaction component to generate an electronic signal transmitted to the user system using a transmission circuit, and wherein the electronic signal allows communication between the user system and the service provider system, the service interaction component further configured to collect predefined information about the user system and the associated user, the predefined information comprising at least a first computer-executable input indicative of an identifier of the user system and the associated user and a second computer-executable input indicative of a service sought for delivery in the service setting by the service provider; and
        a payment engine for processing payments digitally based on data worth associated with the data owned by the user and authorized for sharing by the service provider to the buyer system, wherein the payment engine calculates a payable amount payable digitally by the user to the service provider based on:
            a first digital transactional value indicative of a service charge for the service delivered digitally by the service provider;
            a second digital transactional value indicative of a predefined co-pay between the user and a co-pay entity; and
            a third digital transactional value indicative of the data worth associated with the data owned by the user and authorized for sharing,
        wherein the data worth is calculated based on a set of predefined criteria specified by the buyer entity for a set of data types, data entities and data attributes; and
        a pre-consenting system located remotely from the user system and communicatively coupled to the service provider system in the service setting, wherein the pre-consenting system is configured to receive a digital signal containing a third computer-executable input for authorizing sharing of the data owned by the user at least in part toward a digital purchase and delivery of the service from the service provider by the user such that the data owned by the user serves as a transactional value for the digital purchase and delivery of the service as and when the data is made available,
        wherein the pre-consenting system is further configured to generate a trigger that is initiated upon electronic receipt of the third computer-executable input by the pre-consenting system, the trigger containing a unique code referencing the user, the user system and authorized data of the user for storage, processing, and sharing of the authorized data.

2. The system of claim 1, wherein the pre-consenting system is configured to generate an electronic trigger that is initiated upon electronic receipt of the third computer-executable input by the pre-consenting system that is indicative of the user authorization for sharing at least one or more computer executable files containing the authorized data of the user.

3. The system of claim 1, wherein the trigger includes a unique code referencing the user, the user system, and the authorized data of the user for storage, processing, and sharing of the authorized data.

4. The system of claim 1, wherein the pre-consenting system further comprising a processing circuit to process the data associated with the user system as a response to a request made by the service provider system for authorization of use of the data against a service provided by the service provider system digitally.

5. The system of claim 4, wherein the processing circuit further comprising at least one of:
    a data recognition device, an audio signal recognition device, a video signal recognition device, and a fingerprint identifier input device, wherein the at least one of the data recognition device, the audio signal recognition device, the video signal recognition device, and the fingerprint identifier input device is configured to process the data digitally coming from the user system as a response to a request made by the service provider system for the authorization of data usage against the service charge for the service provided by the service provider system.

6. The system of claim 5, wherein the data recognition device includes a programmable electronic device configured to automatically recognize and capture user associated information including one or more of an associated phone number, and an associated email address of the user and associated with the user system to serve as an input for initializing payment by the payment engine.

7. The system of claim 5, wherein the fingerprint identifier input device includes a programmable radio frequency (RF) device reader to capture the response from the user system and record it for later use as the authorization for sharing the user data by the service provider system in exchange of the digital service delivery to the user.

8. The system of claim 5, wherein the pre-consenting device is programmed to generate at least one of a random number, a checksum, and a cryptographic code using at least one of a randomization function, and a checksum function, and a cryptographic hash serving as an authorization token transmitted by the pre-consenting device to the service provider system processing the payment by the payment engine and sharing the user data.

9. The system of claim 1, further comprising a data valuation device configured to evaluate worth of approved data owned by the user and received by the service provider system and authorized for sharing by the user, wherein the worth of the approved data is calculated based on a set of predefined criteria specified for a set of data types, data entities and data attributes so that the delivery of the service is defined in terms of transactional values payable through the user data by the user upon authorization through the pre-consenting system.

10. The system of claim 1 further comprising a data extraction device to pull the data from the service provider system, contained in a central data center, corresponding to the user that has been authorized for transaction by the user system.

11. The system of claim 1, wherein the payment engine is enabled through a digital banking procedure for processing digital transactions.

12. The system of claim 1, wherein the payment engine is enabled through a blockchain-enabled component for processing digital transactions.

13. The system of claim 1, further comprising a blockchain device to process blockchain tasks through blockchain-enabled tools and a computer, wherein the blockchain device is located at a location remote from locations of the user system and the buyer system.

14. The system of claim 13, wherein the blockchain device is coupled to a blockchain database that is located at a location remotely from the locations of the user system and the buyer system.

15. The system of claim 13, wherein the blockchain device further comprising a processing device to process blockchain tasks through the computer.

* * * * *